(12) United States Patent  
Lee

(10) Patent No.: US 7,570,917 B2  
(45) Date of Patent: Aug. 4, 2009

(54) BLUETOOTH COMMUNICATION THROUGH A SINGLE VIRTUAL PORT

(75) Inventor: Reo Lee, Mississauga (CA)

(73) Assignee: PSION TEKLOGIX Inc., Mississauga, Ontario (CA)

( * ) Notice: Subject to any disclaimer, the term of this patent is extended or adjusted under 35 U.S.C. 154(b) by 535 days.

(21) Appl. No.: 11/324,078

(22) Filed: Dec. 30, 2005

(65) Prior Publication Data

US 2007/0155324 A1 Jul. 5, 2007

(51) Int. Cl.
*H04B 7/00* (2006.01)

(52) U.S. Cl. .................... 455/41.2; 455/41.1; 455/41.3; 455/556.1; 370/328; 370/338

(58) Field of Classification Search ................ 455/41.2, 455/41.1, 41.3, 556.1, 566, 90.3; 370/328, 370/338

See application file for complete search history.

(56) References Cited

U.S. PATENT DOCUMENTS 6,760,804 B1 7/2004 Hunt et al.

2003/0188028 A1 10/2003 Kawamura
2004/0198219 A1 * 10/2004 Malmstrom et al. ........ 455/41.1

FOREIGN PATENT DOCUMENTS

EP 1261174 11/2002

* cited by examiner

*Primary Examiner*—Tuan A Pham
(74) *Attorney, Agent, or Firm*—Pearne & Gordon LLP

(57) ABSTRACT

A system that provides for Bluetooth communications from a first Bluetooth enabled device to a second Bluetooth enabled device is provided. The system comprising a Bluetooth manager that provides a graphical user interface, an Outgoing Port Driver that shares configurational information with and is started by the Bluetooth manager, a first serial port that receives data from an application operating on the first device, the first serial port acting as a virtual serial port where the first serial port is not connected to communications hardware, a second serial port that is connected to communications hardware, the second serial port acting as an outgoing port, and a Bluetooth stack that receives data to be communicated from the second serial port, wherein the Outgoing Port Driver directs the data from the first serial port to the second serial port via the Outgoing Port Driver.

14 Claims, 7 Drawing Sheets

BLUETOOTH COMMUNICATION THROUGH A SINGLE VIRTUAL PORT

FIELD OF INVENTION

The invention relates generally to devices enabled with Bluetooth capabilities, and more particularly for enhancing usability of Serial Port Profile (SPP) of the Bluetooth Protocol.

BACKGROUND OF THE INVENTION

The Bluetooth communications protocol is a system for short-range wireless communication between devices.

In a typical scenario a Bluetooth enabled device A wishes to communicate with similarly enabled device B using a Bluetooth connection. In a traditional configuration communication cannot take place at the first instance where the devices are in range to do so. Namely device A does not a priori know of the presence of device B and therefore can not communicate with it. A flow chart of the process for establishing communications is shown in FIG. 1. At step 102 device A executes a scan-associate process at the time communications are requested. This scan-associate process is often a time consuming process with times of up to a couple of minutes being common. The presence of device B is established at step 104. With the presence of device B established a virtual serial port is created in device A at step 106 and at step 108 communications are initiated between device A and B.

FIG. 2 is a schematic diagram of a Bluetooth enabled Device A 202 that may have been used in the above method. Along with some hardware the diagram presents functional components involved in the Bluetooth communications, where the functional components are elements of software or states created by software that interact with the hardware of the device 202.

An application 204 operating within Device A 202 requests Bluetooth communications with Device B 203. A Bluetooth stack 210 may be provided either within or in addition to the operating system of the device 202. The stack 210 implements various layers of Bluetooth functionality, it provides RFComm protocol implementation to simulate serial port functionality of a Bluetooth radio 212 and it provides SDP implementation to do discovery and searching of Bluetooth devices and services.

A user uses the Bluetooth manager 208 to activate a connection to a remote device such as the Device B 203. The Bluetooth manager 208 then interacts with the Bluetooth stack 210, which creates a virtual serial port. A Bluetooth Manager 208 is in communications with the stack 210 and executes independently of it. The Bluetooth manager 208 is appropriate for providing an interface between a user and the stack 210. In this example the virtual serial port BSP2: 206 is opened. The Bluetooth stack 210 receives the data from the application 204, via the virtual serial port 206, and provides it to the Bluetooth radio 212.

In another system of the art an automatic scan-associate process is performed periodically to determine Bluetooth devices that are available for communications. Once it is determined that communications would be possible for a particular device it is added to a list of devices available for communications. In the above system the list of possible devices is not configurable by the user.

There are also systems in the art for which the availability of Bluetooth communications is advantageous yet it is not desirable to have the system "discoverable" during a scan-associate process. Such a situation may arise for systems located in public spaces. In this scenario one does not want the Bluetooth functionality visible to any member of the public, which has access to the system and has the ability to scan for a Bluetooth enabled device contained therein.

Thus there is a need for a system that does not require a scan-associate process at the time of communications, provides a user configurable list of devices with which communications may be established and does not require the system to identify itself as "discoverable" to other Bluetooth enabled devices.

SUMMARY OF THE INVENTION

The present invention relates to a system and method for SPP in Bluetooth protocol.

It is an object of the invention to provide an improved system and method for Bluetooth communications. It is a further object of the invention to obviate or mitigate at least one of the drawbacks of the prior art.

In accordance with one aspect of the invention a system that provides for Bluetooth communications from a first Bluetooth enabled device to a second Bluetooth enabled device is provided. The system comprising a Bluetooth manager that provides a graphical user interface, an Outgoing Port Driver that shares configurational information with and is started by the Bluetooth manager, a first serial port that receives data from an application operating on the first device, the first serial port acting as a virtual serial port where the first serial port is not connected to communications hardware, a second serial port that is connected to communications hardware, the second serial port acting as an outgoing port, and a Bluetooth stack that receives data to be communicated from the second serial port, wherein the Outgoing Port Driver directs the data from the first serial port to the second serial port via the Outgoing Port Driver.

This summary of the invention does not necessarily describe all features of the invention. Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

These and other features of the invention will become more apparent from the following description in which reference is made to the appended drawings wherein.

DETAILED DESCRIPTION

The present invention provides a system and method of enabling Bluetooth communications between two Bluetooth enabled devices. The method allows for user configuration, limits the number of open serial ports and does not require the user perform a scan-associate process at the time of communications.

Figure 3:
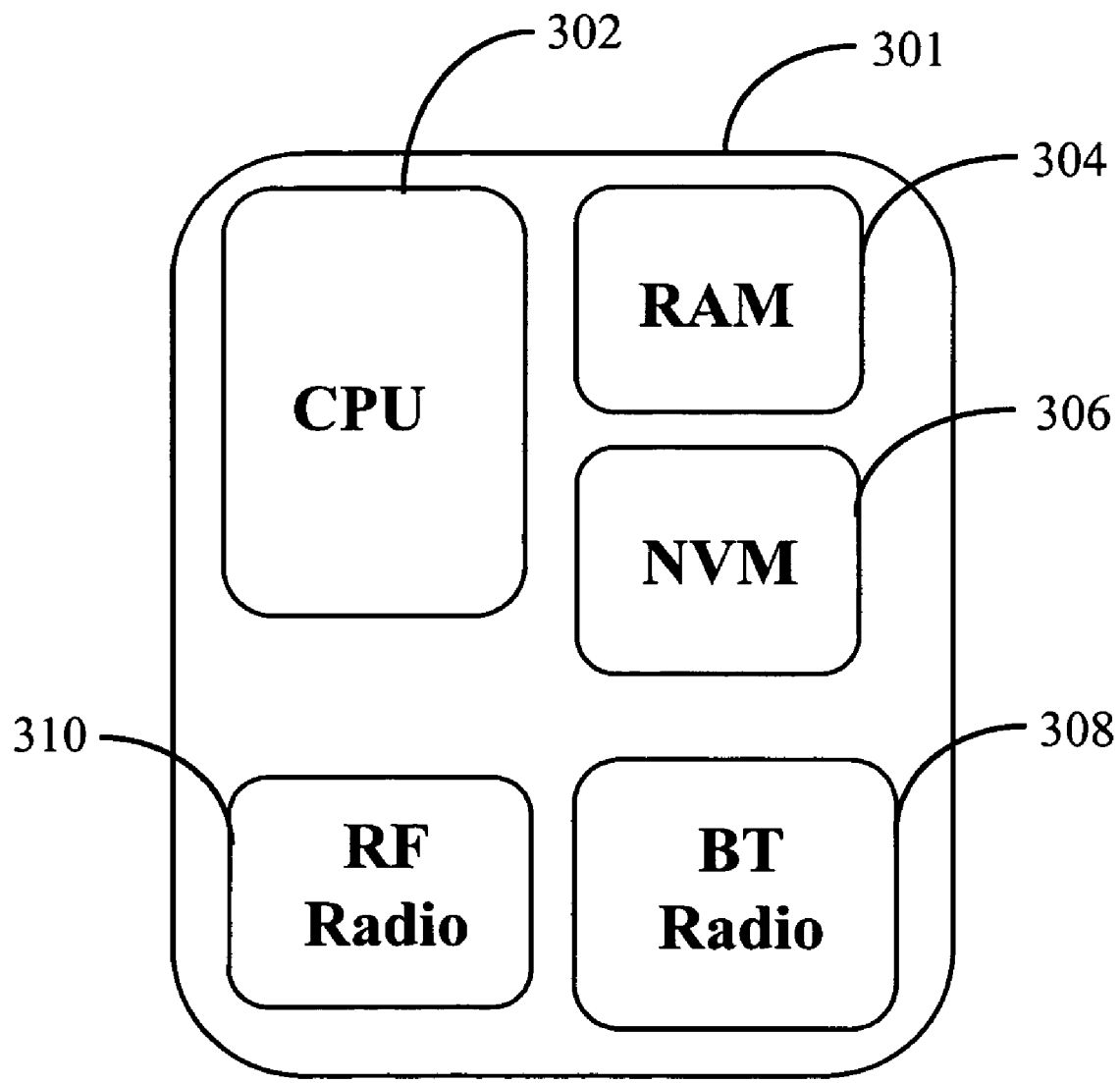
FIG. 3 is a schematic block diagram of a Bluetooth device according to an embodiment of the invention.

FIG. 3 schematically depicts a device on which the present invention may operate. In the current embodiment this device is a hand held terminal appropriate for the collection of data. The device 301 contains within it a CPU 302, random access memory 304, non-volatile memory 306 and Bluetooth radio 308. The device of the current embodiment further contains RF radio 310. The term radio as is used to describe the RF radio 310 and Bluetooth radio 308 generally includes those elements that are required for these types of communications as will be apparent to a person of skill in the art. The system of the current invention will generally be stored as electronic signals within non-volatile memory 306. The system will be operative within CPU 302 and may be fully or partially loaded in RAM 304 during operation. It will be apparent to a person of skill in the art that the invention may be used on any device appropriate for storing and operating programs and is enabled for Bluetooth communications. It will also be apparent to one skilled in the art that FIG. 3 does not necessarily present all components within Bluetooth enabled device 301.

Figure 1:
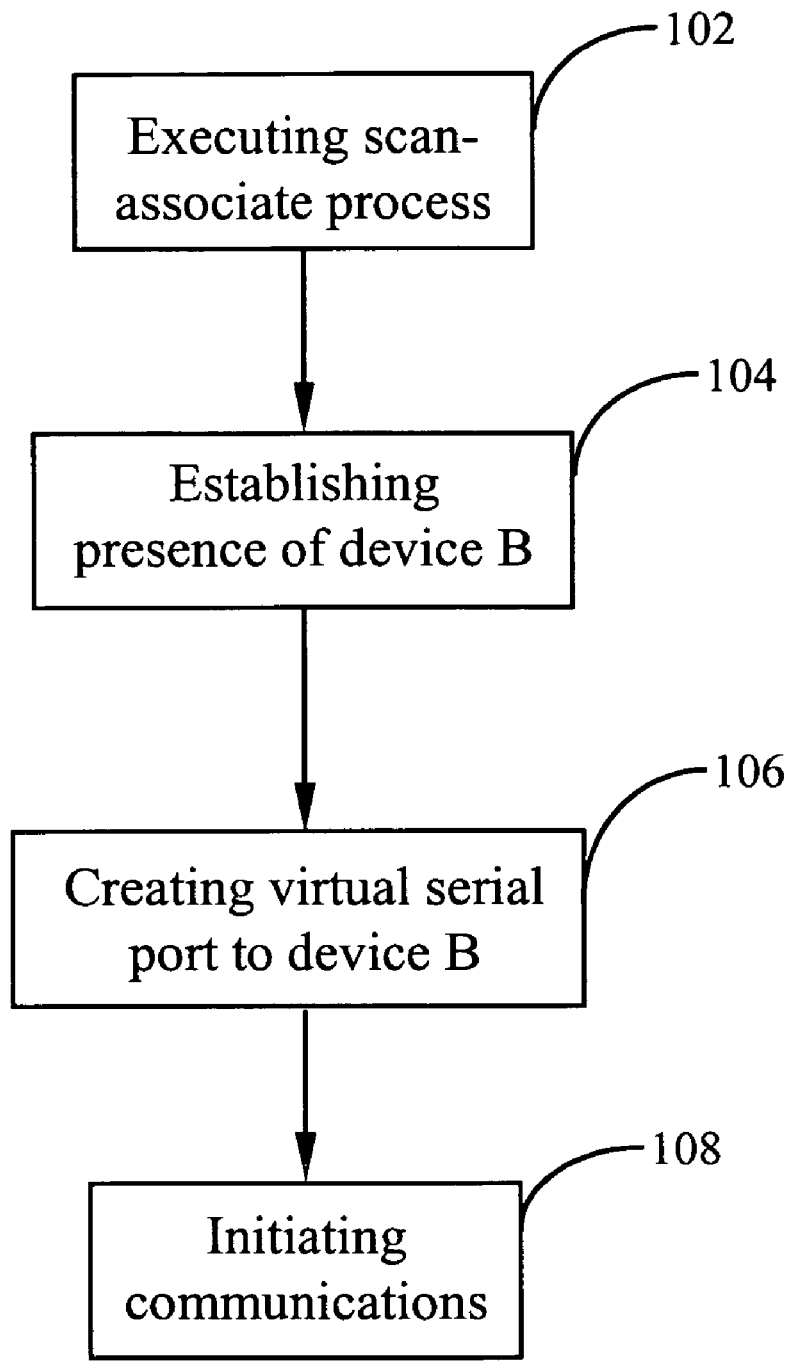
FIG. 1 is a flow chart of a method for connecting to a Bluetooth device of the Prior Art.
Figure 2:
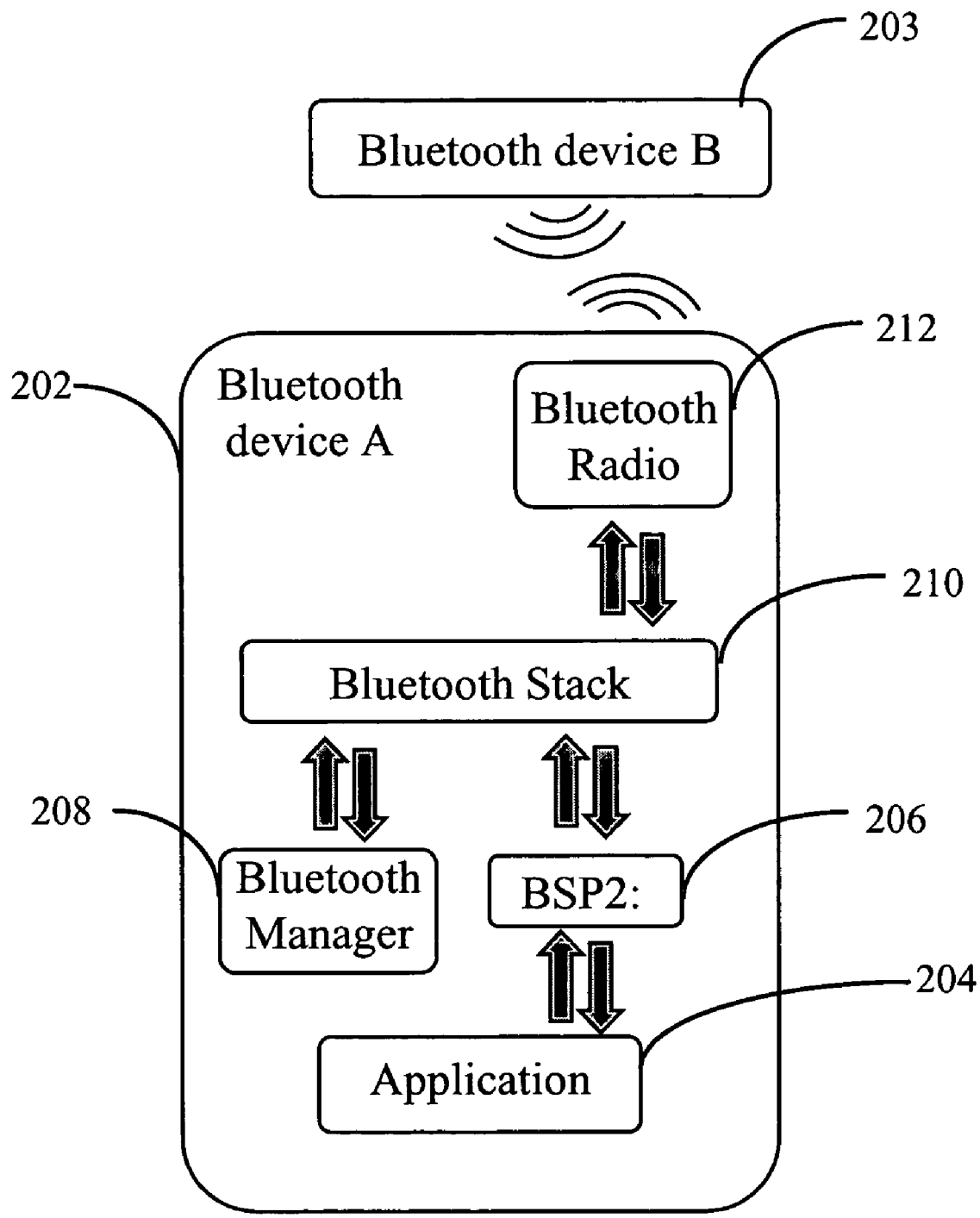
FIG. 2 is a schematic block diagram of components of a Bluetooth device of the Prior Art.
Figure 4:
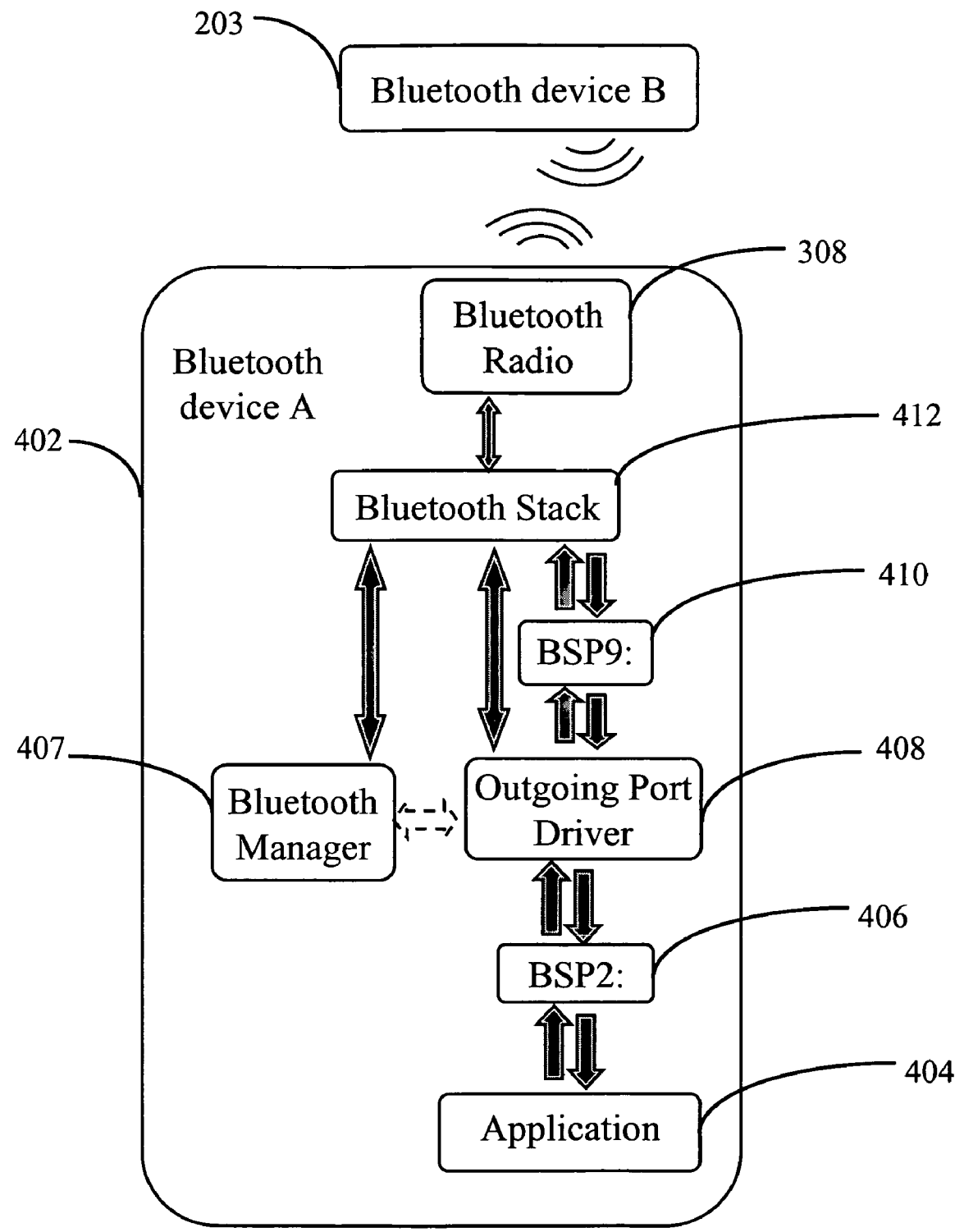
FIG. 4 is a schematic diagram of components of a Bluetooth device according to an embodiment of the invention.

FIG. 4 is a schematic block diagram of a Bluetooth enabled Device 402 according to the current embodiment. FIG. 4 depicts features of this device at the time where the device 402 is communicating with the device B 203. As in FIG. 2 the elements presented in FIG. 4 may be elements of hardware, software or states constructed by the software, with the latter two elements generally interacting with and/or operating on elements of hardware including those illustrated in FIG. 3. FIG. 4 also depicts the nature of interaction between the various elements. The solid block arrows indicate a flow of data and or function calls between the elements while a dashed arrow indicates the exchange of configurational information.

In the current embodiment the device A 402, in particular CPU 302, is running the Windows™ CE operating system thereon. It will be apparent to those of skill in the art that other operating systems including, but not limited to, Linux, Apple OS X and Palm OS are within the scope of the present invention. Bluetooth manager 407 is a Graphical User Interface (GUI) that is used by the user of the device A 402 to configure a Bluetooth subsystem of the device 402 for communications. The Bluetooth manager 407 communicates with a Bluetooth stack 412 and provides configurational information to an Outgoing Port Driver 408. In the current embodiment the stack 412 is a Microsoft™ Bluetooth stack, which is provided with the Windows CE operating system. Other implementations of the Bluetooth stack, which are appropriate for the implemented operating system, including Windows CE, are also within the scope of the present invention.

The Outgoing Port Driver 408 is a central entity of the current embodiment. The Outgoing Port Driver 408 is a virtual device driver that is in the form of a .DLL file. The Outgoing Port Driver 408 creates the virtual serial port 406 and the Outgoing Serial Port 410 (BSP9:), which becomes the outgoing port. The virtual serial port 406 is used by the application 404. It is a virtual port in the sense that the application 404 considered it to be the outgoing port while it does not have any physical serial communication hardware associated therewith. The Outgoing Port Driver 408 further provides the Bluetooth manager 407 to the user and ensures that the Bluetooth stack 412 connects to the desired device.

The virtual serial port 406, Outgoing Port Driver 408, Outgoing Serial Port 410, Bluetooth stack 412 are all elements of the data path that is formed between the application 404 and the Bluetooth radio 414.

The system of the present invention allows communication between Bluetooth enabled devices without performing a scan-associate process at the time of communications. Further, the method allows for communication to a device that is among a fixed list of devices. These aspects will now be considered with regard to the system presented in FIG. 4.

The method of communication according to an embodiment of the invention is performed in two steps. In the first step the device is configured for communications. This step occurs prior to the time at which communications are desired. It may be performed by the user or a system administrator and may be considered as a set-up procedure. The second step occurs at the time of communications. It is during this step that the Device is configured as outlined in FIG. 4.

Figure 5A:
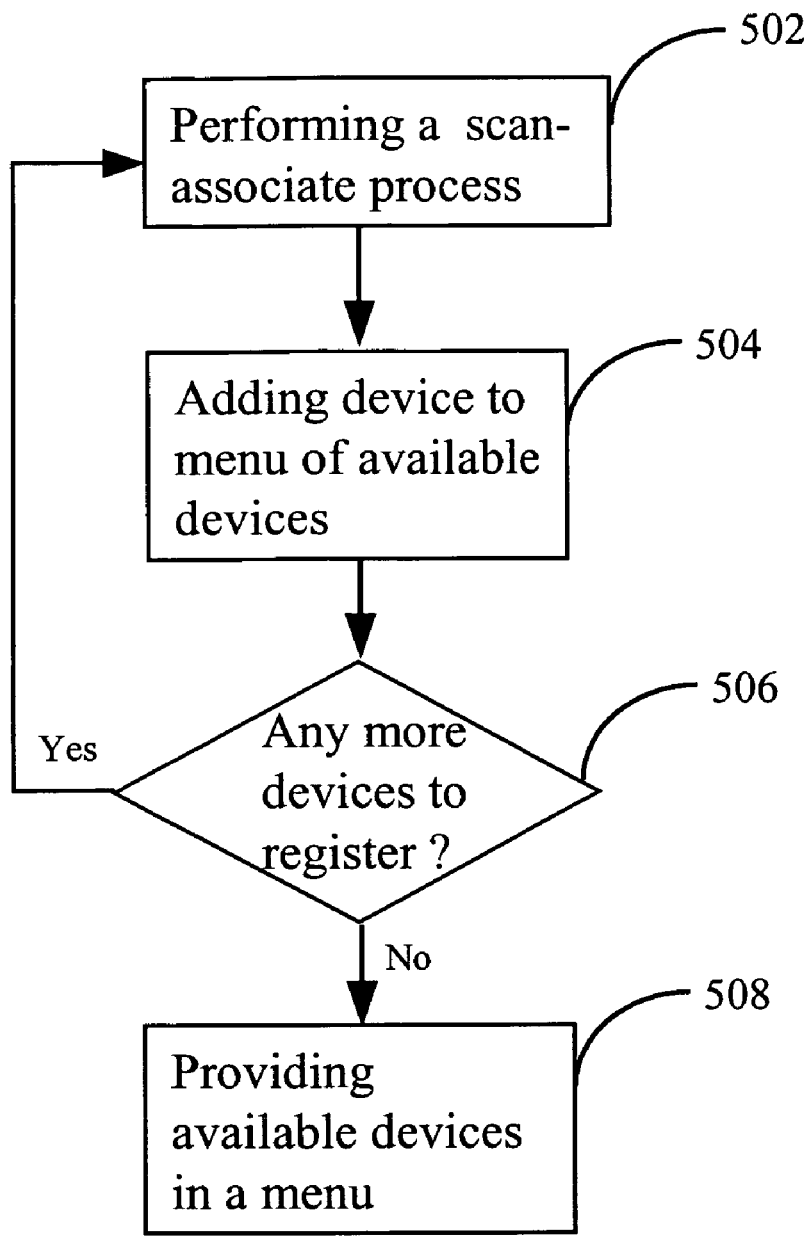
FIG. 5a is a flow chart of a method of configuring a Bluetooth device according to an embodiment of the invention.

The set-up procedure according to an embodiment of the invention is shown in FIG. 5a. At step 502 a scan-associate process is performed. A device that has responded to this process is added to a menu of available devices at step 504. At step 506 the process asks whether there are any more devices to be added to list of available devices. If there are additional devices the process returns to step 502 and another scan-associate process is performed. If there are no further devices to be registered the process moves to step 508 where a menu listing the available devices is provided. With regard to the discussion of FIG. 4 the device B 203 would be a device that is listed in the above menu.

Figure 5B:
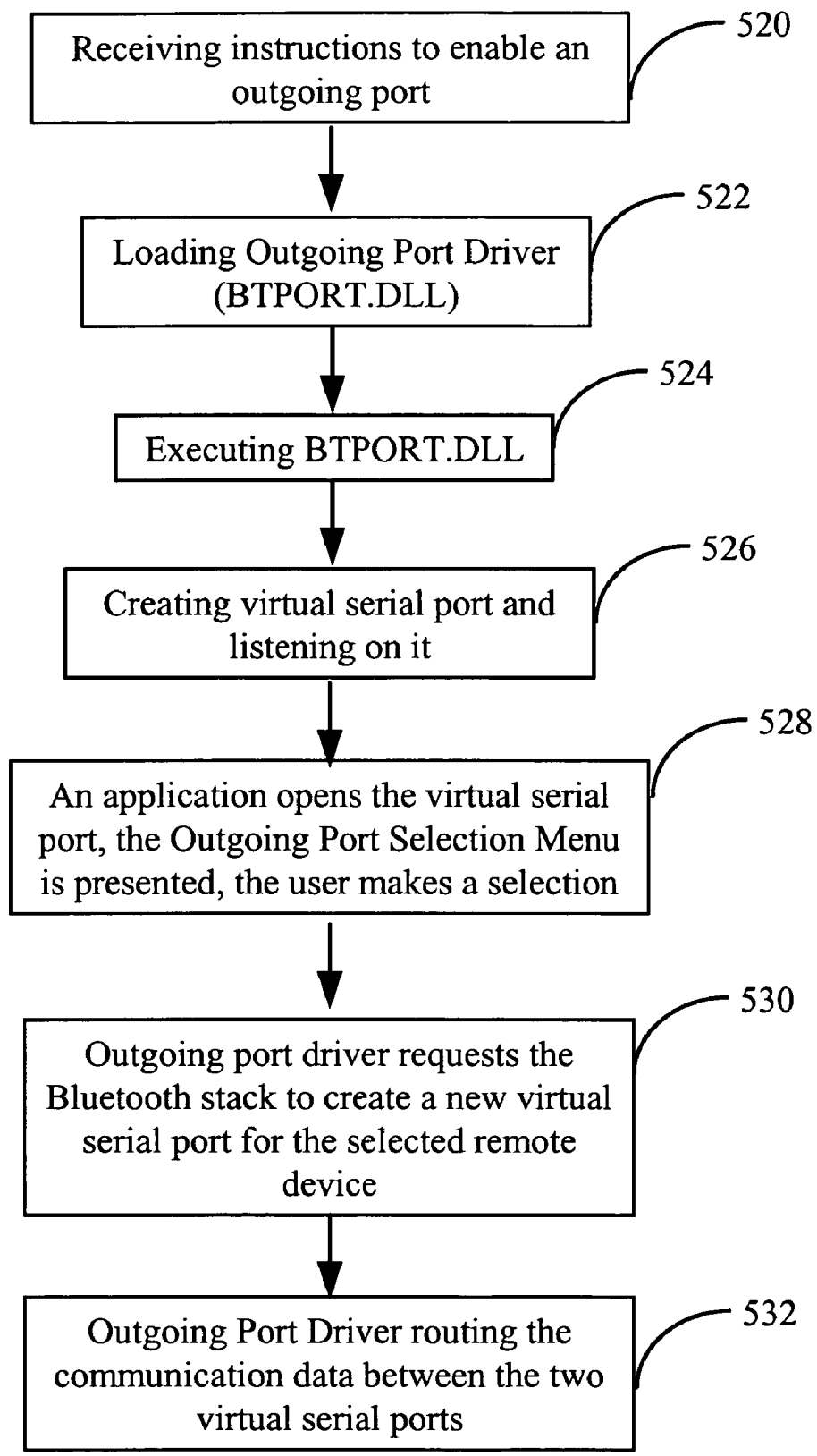
FIG. 5b is a flow chart of a method for establishing communications to a Bluetooth device according to an embodiment of the invention.

FIG. 5b presents a flow chart of a method of establishing communications at the time that communications are desired. At step 520 the Bluetooth manager 407 receives instructions to load the Outgoing Port Driver 408. At step 522 the Outgoing Port Driver 408 is loaded. The Outgoing Port Driver 408 begins executing at step 524. At step 526 it creates the virtual serial port 406, which is named BSP2: and listens on the port 406. The application 404 opens the virtual serial port 406 and the user chooses the Bluetooth device to which remote connections are to be made, say device B 203, from the selection menu. The Outgoing Port Driver 408 receives this choice at step 528. At step 530 the Outgoing Port Driver 408 communicates with the Bluetooth stack 412 to create the Outgoing Serial Port 410 (BSP9:). At step 532 the Outgoing Port Driver 408 creates the Outgoing Serial Port 410. The Outgoing Port Driver 408 redirects all the data flow from the application 404, via the Virtual Serial Port 406, to the Outgoing Serial Port 410. Thus data traffic is run to and from that port at step 534.

Figure 6A:
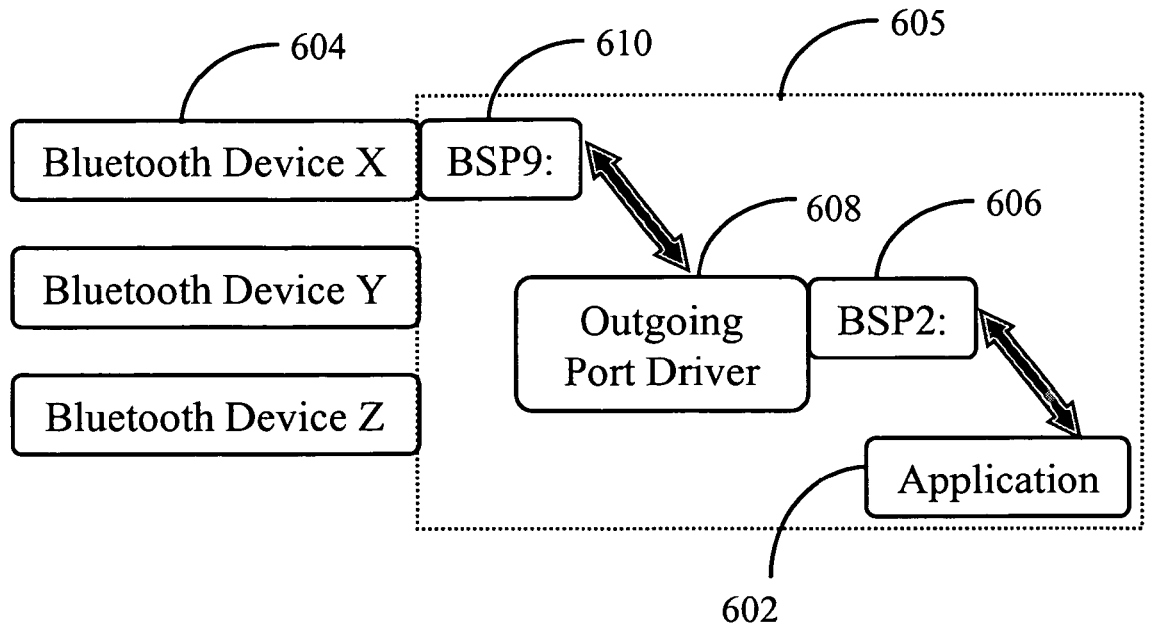
FIG. 6a is a schematic block diagram illustrating a connection to a Bluetooth device according to an embodiment of the invention.
Figure 6B:
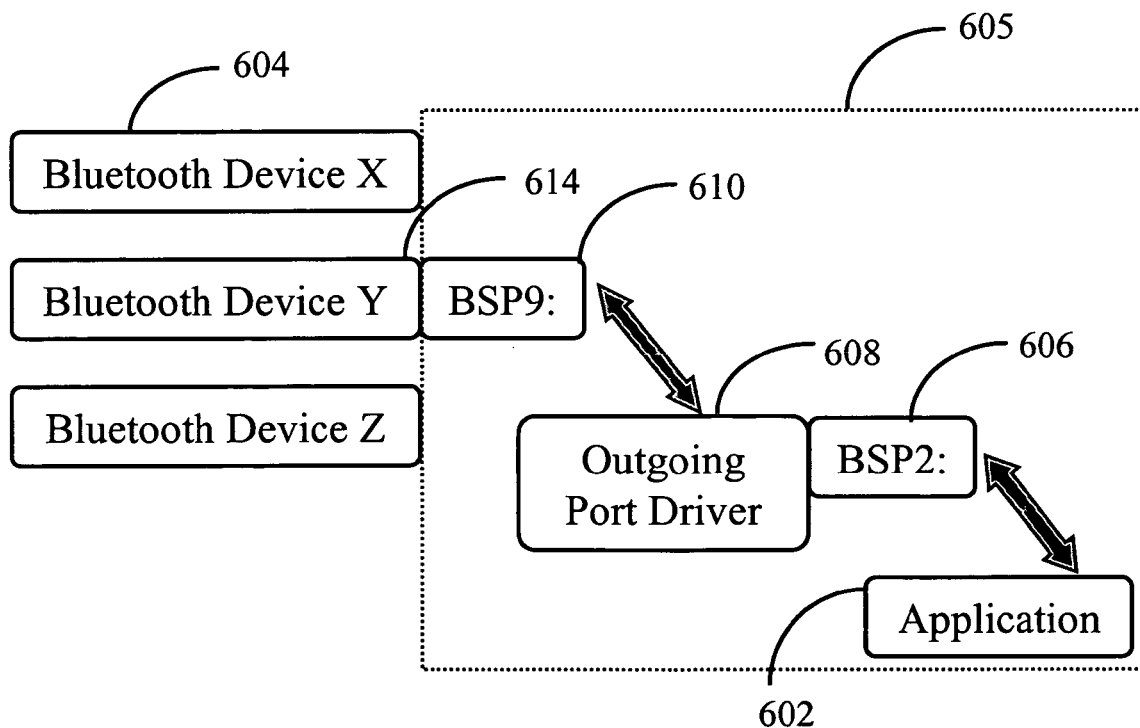
FIG. 6b is a schematic block diagram illustrating the connection to a Bluetooth device according to an embodiment of the invention.

The procedure for connecting to a new device is schematically shown in FIGS. 6a and 6b. In FIG. 6a an application 602 is in communication with a Device X 604, where the application 602 is operating in a device 605. In particular, data from the application 602 flows through the virtual serial port 606 (BSP2:) to the Outgoing Port Driver 608 and through the serial port 610 to the device X 604. The Device X 604 being selected from a selection menu accessed by and contained within the device A 402.

When the user of the Device A 605 wishes to establish communications with another device, say device Y 614 they bring up the Selection Menu and select the device from it. The Outgoing Port Driver 608 maintains the port BSP2: 606 that it created but deactivates the connection with Device X 604 by deleting the port BSP9: 610. The driver 608 activates a new connection with the Device Y 614 by creating the port BSP9: 610 again. This provides seamless switching over to the new device 614 without performing a scan-associate process.

The following example illustrates the operation and use of the system and method of the current embodiment. In a warehouse situation there is a selection of network access points, printers and scanners to which the operator of a hand held data capture terminal may have to communicate. At a predetermined interval an administrator performs a scan-associate process for the Bluetooth enabled devices to which the user may wish to communicate. Once this process is performed a list of available devices is compiled. During the use of the hand-held terminal the user can select the device to which communications are to be established from the selection menu.

The Outgoing Port Prompt Mode is a configuration that a user can set via the Bluetooth manager that governs the behaviour of the Outgoing Port Selection Menu. It has two choices "every time" and "once". Setting the value to "every time" means that the Outgoing Ort Selection Menu will come up automatically every time an application 'opens' the Outgoing Port. Setting the value to "once" means the Outgoing Port Selection Menu will come up automatically only when an application "opens" the Outgoing Port and there is no current selection of remote device. the hotkey invocation of the Outgoing Port Selection Menu is available regardless of the value of the Outgoing Port Prompt Mode.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A method of communications over a wireless network by a first device, the first device having a Bluetooth stack for implementing Bluetooth functionality and an application, data being communicated to and from the application to a second device, the method comprising the steps of:
    setting up the first device port to the communications, including:
        performing a scan-associate process; and
        updating a menu of available remote devices in dependence upon a result of the scan-associate process;
    establishing and performing the communications based on a selection from the menu without activating the scan-associate process, including:
        creating a virtual serial port for a communication with the application on the first device;
        opening the virtual serial port;
        providing the menu to the user and receiving a selection of the second device to which communications are to be made, the second device being listed on the menu;
        creating an outgoing serial port for a communication with the second device; and
        routing data from the virtual serial port to the outgoing serial port.

2. The method according to claim 1, further comprising:
    switching a connection from the second device to a third device, including:
        providing the menu to the user and receiving a selection of the third device to which communications are to be made, the third device being listed on the menu;
        deleting the outgoing serial port for a communication with the second device; and
        creating a new outgoing serial port for a communication with the third device.

3. The method according to claim 1, further comprising:
    setting an outgoing port prompt mode for governing the menu.

4. The method according to claim 3, wherein the outgoing port prompt mode includes a first mode in which the menu comes up automatically every time the outgoing port is open.

5. The method according to claim 3, wherein the outgoing port prompt mode includes a second mode in which the menu comes up automatically only when the outgoing port is open and there is no selection from the menu.

6. The method according to claim 1, wherein the step of establishing and performing comprising:
    loading an outgoing port driver for creating the virtual serial port and the outgoing serial port.

7. The method according to claim 1, wherein the step of updating comprises:
    compiling a list of the available Bluetooth devices once the scan-associate process is performed.

8. A wireless device for communications over a wireless network, the wireless device having a Bluetooth stack for implementing Bluetooth functionality and an application, data being communicated to and from the application to a remote device, characterized in that the wireless device comprises:
    a module for setting up the wireless device prior to the communications, including:
        a module for performing a scan-associate process; and
        a module for updating a menu of available remote devices in dependence upon a result of the scan-associate process;
    a module for establishing and performing the communications based on a selection from the menu without activating the scan-associate process, including:
        a module for providing the menu to a user for selection of the remote device from the menu; and
        an outgoing port device for creating a virtual serial port for a communication with the application and for creating an outgoing serial port for a communication with the remote device in response to the selection of the remote device from the menu;
        wherein data from the application is routed from the virtual serial port to the outgoing serial port.

9. The wireless device according to claim 8, wherein the outgoing port device deletes the current outgoing serial port and creates a new outgoing serial port, in dependence upon the user's selection from the menu.

10. The wireless device according to claim 8, wherein the wireless device comprises:
    an outgoing port prompt mode for governing the menu.

11. The wireless device according to claim 10, wherein the outgoing port prompt mode includes:
    a first mode in which the menu comes up automatically every time the outgoing port is open.

12. The wireless device according to claim 10, wherein the outgoing port prompt mode includes:
    a second mode in which the menu comes up automatically only when the outgoing port is open and there is no selection from the menu.

13. The wireless device according to claim 8, wherein the outgoing port device is loaded.

14. The wireless device according to claim 8, wherein the module for updating comprises:
    a module for compiling a list of the available Bluetooth devices once the scan-associate process is performed.

* * * * *

UNITED STATES PATENT AND TRADEMARK OFFICE
CERTIFICATE OF CORRECTION

| | |
|---|---|
| PATENT NO. | : 7,570,917 B2 |
| APPLICATION NO. | : 11/324078 |
| DATED | : August 4, 2009 |
| INVENTOR(S) | : Lee |

Page 1 of 1

It is certified that error appears in the above-identified patent and that said Letters Patent is hereby corrected as shown below:

In Column 5, Line 21, delete "device. the" and insert -- device. The --, therefor.

Signed and Sealed this
Nineteenth Day of March, 2013

Teresa Stanek Rea
*Acting Director of the United States Patent and Trademark Office*